(12) United States Patent
Takeuchi

(10) Patent No.: US 7,342,718 B2
(45) Date of Patent: Mar. 11, 2008

(54) STAGE, AND BIOLOGICAL MICROSCOPE WITH THE STAGE

(75) Inventor: Atsushi Takeuchi, Yokohama (JP)

(73) Assignee: Nikon Corporation, Tokyo (JP)

( * ) Notice: Subject to any disclaimer, the term of this patent is extended or adjusted under 35 U.S.C. 154(b) by 52 days.

(21) Appl. No.: 10/548,797

(22) PCT Filed: Mar. 12, 2004

(86) PCT No.: PCT/JP2004/003342

§ 371 (c)(1),
(2), (4) Date: Sep. 12, 2005

(87) PCT Pub. No.: WO2004/081632

PCT Pub. Date: Sep. 23, 2004

(65) Prior Publication Data

US 2006/0187543 A1    Aug. 24, 2006

(30) Foreign Application Priority Data

Mar. 14, 2003    (JP)    ............... 2003-070626

(51) Int. Cl.
G02B 21/26    (2006.01)
(52) U.S. Cl. ..................... 359/393; 359/391
(58) Field of Classification Search ............... 359/393, 359/391
See application file for complete search history.

(56) References Cited

U.S. PATENT DOCUMENTS

| 4,711,537 A | 12/1987 | Schindl et al. |
| 4,766,465 A | 8/1988 | Takahashi |
| 5,768,013 A | 6/1998 | Kraft |
| 6,049,420 A | 4/2000 | Kraft |
| 6,313,945 B1 | 11/2001 | Takeuchi |

FOREIGN PATENT DOCUMENTS

| JP | 8-304708 | 11/1996 |
| JP | 2000-330035 | 11/2000 |

*Primary Examiner*—Joshua L Prichett
(74) *Attorney, Agent, or Firm*—Morgan, Lewis & Bockius LLP

(57) ABSTRACT

A stage movable in the X and Y directions includes a base member, first and second moving members, and first and second rotational operation mechanisms. The first moving member is provided with a movement transmission mechanism that allows linear movement of the second moving member in a first direction and causes, when the first moving member moves in a second direction, the first and second moving members to move together in the second direction, and the second moving member is provided with a transmission portion that engages a linear movement member so that it moves upon movement of the linear movement member. The linear movement member transmits movement to the transmission portion to cause the second movement member to move in a first direction and guides the transmission portion upon linear movement of the first and second moving members in the second direction by the movement transmission mechanism.

10 Claims, 8 Drawing Sheets

STAGE, AND BIOLOGICAL MICROSCOPE WITH THE STAGE

TECHNICAL FIELD

The present invention relates to a stage that can be moved horizontally in X and Y directions suitable for a biological microscope and to a biological microscope equipped with such a stage.

BACKGROUND ART

Heretofore, stages for use in, for example, a microscope that can be moved horizontally in X and Y directions by rotating an operation handle have been known. In such a stage, if the stage is constructed in such a way that the operation handle itself moves together with the stage when the stage is moved horizontally, it is necessary for the operator to move his/her hand following the operation handle. Such a stage is not easy to operate. In view of this, stages in which the position of the operation handle is fixed regardless of horizontal movement of the stage have been proposed (see, for example, Japanese Patent Application Laid-Open No. 2000-330035).

However, the structures of conventional stages in which the position of the handle is fixed are complex, and they suffer from the problem of high manufacturing cost.

DISCLOSURE OF THE INVENTION

The present invention has been made in view of the above-described problem and has as an object to provide a stage having a simple structure and good usability while reducing the cost as compared to the stages having complex structures mentioned above, and to provide a microscope equipped with such a stage.

To achieve the above object, according to the present invention there is provided a stage comprising:

a base member;

a first moving member and a second moving member provided on said base member; and rotational operation means provided on a lower portion of said base member for linearly moving said first moving member and said second moving member respectively, wherein said base member is provided with a linear movement member adapted to move linearly along said base member upon rotation of said rotational operation means, said first moving member is provided with a movement transmission mechanism for moving said first moving member and said second moving member together along said base member in a direction perpendicular to the moving direction of said linear movement member, said second moving member is provided with a transmission portion that is always in contact with said linear movement member so that said second moving member moves along said first moving member upon linear movement of said linear movement member, and said linear movement member causes, upon linear movement of said linear movement member, said second moving member to move linearly while restricting movement of said transmission portion relative to said linear movement member with respect to said moving direction, and guides said transmission portion upon movement of said first moving member and said second moving member in the direction perpendicular to said moving direction caused by said movement transmission mechanism.

According to a first preferred mode of the present invention, in said stage, said transmission portion may be linearly movable along said first moving member and provided on a moving member fixed to said second moving member.

According to a second preferred mode of the present invention, in the stage according to the present invention or the first preferred mode of the invention, said base member may be provided with a guide wheel that is rotated by rotating said rotational operation means, at least one guide wheel that is rotatably provided and a belt or wire that connects said guide wheels, and said linear movement member may be integrally fixed to said belt or wire.

According to a third preferred mode of the present invention, in the stage according to the present invention or the first preferred mode of the invention, said base member may be provided with a gear that is rotated by rotating said rotational operation means, and guide teeth engaging said gear and extending along said moving direction may be provided on said linear movement member.

A biological microscope according to the present invention is equipped with a stage according to the present invention or one of the first to third preferred modes of the invention.

Furthermore, according to the present invention, there is provided a stage comprising:

a base member;

a first moving member and a second moving member provided on said base member; and first and second rotational operation mechanisms provided on a lower portion of said base member for linearly moving said first moving member and said second moving member respectively, wherein a linear movement member that is moved linearly in a first direction by the first rotational operation mechanism is provided on said base member, movement conversion transmission means that is moved linearly in a second direction by the second rotational operation means is provided on the first moving member, said first moving member is provided with a movement transmission mechanism that allows linear movement of said second moving member in the first direction and causes, when the first moving member linearly moves in the second direction, said first moving member and said second moving member to move together linearly in the second direction, said second moving member is provided with a transmission portion that engages said linear movement member so that it moves upon linear movement of said linear movement member, and said linear movement member transmits its linear movement to said transmission portion to cause said second movement member to move linearly in said first direction and guides said transmission portion upon linear movement of said first moving member and said second moving member in said second direction by said movement transmission mechanism.

EMBODIMENT OF THE INVENTION

In the following, embodiments of the present invention will be described in detail with reference to the accompanying drawings.

First Embodiment

Figure 1:
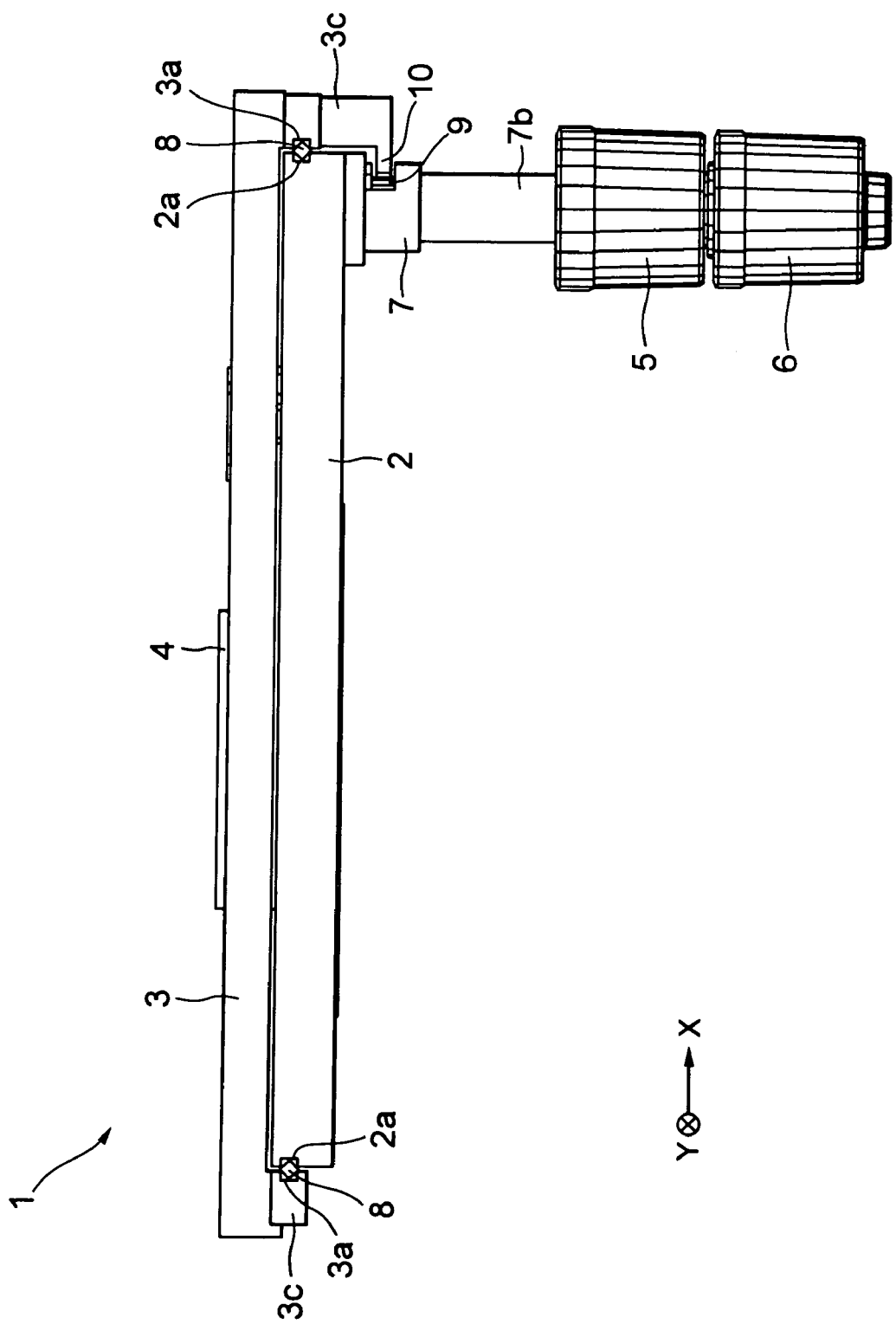
FIG. 1 shows the appearance of a stage according to the first embodiment of the present invention as seen from its side.

A stage according to the first embodiment of the present invention will be described with reference to FIGS. 1 through 4 and 7. In FIG. 1, the stage 1 of this embodiment is composed of a base member 2 to be fixed on a stage mount surface of, for example, a microscope, a first moving member 3 provided on the base member 2 in such a way as to be movable in the first direction (Y direction), and a second moving member 4 provided in such a way as to be movable in the second direction (X direction) that is orthogonal to the first direction.

The base member 2 is a plate-like member extending along the X and Y directions and has an aperture 2c for allowing illumination light etc. from below the stage 1 to pass through it. A rotational operation means 7 is provided on the base member 2 downwardly.

Figure 3:
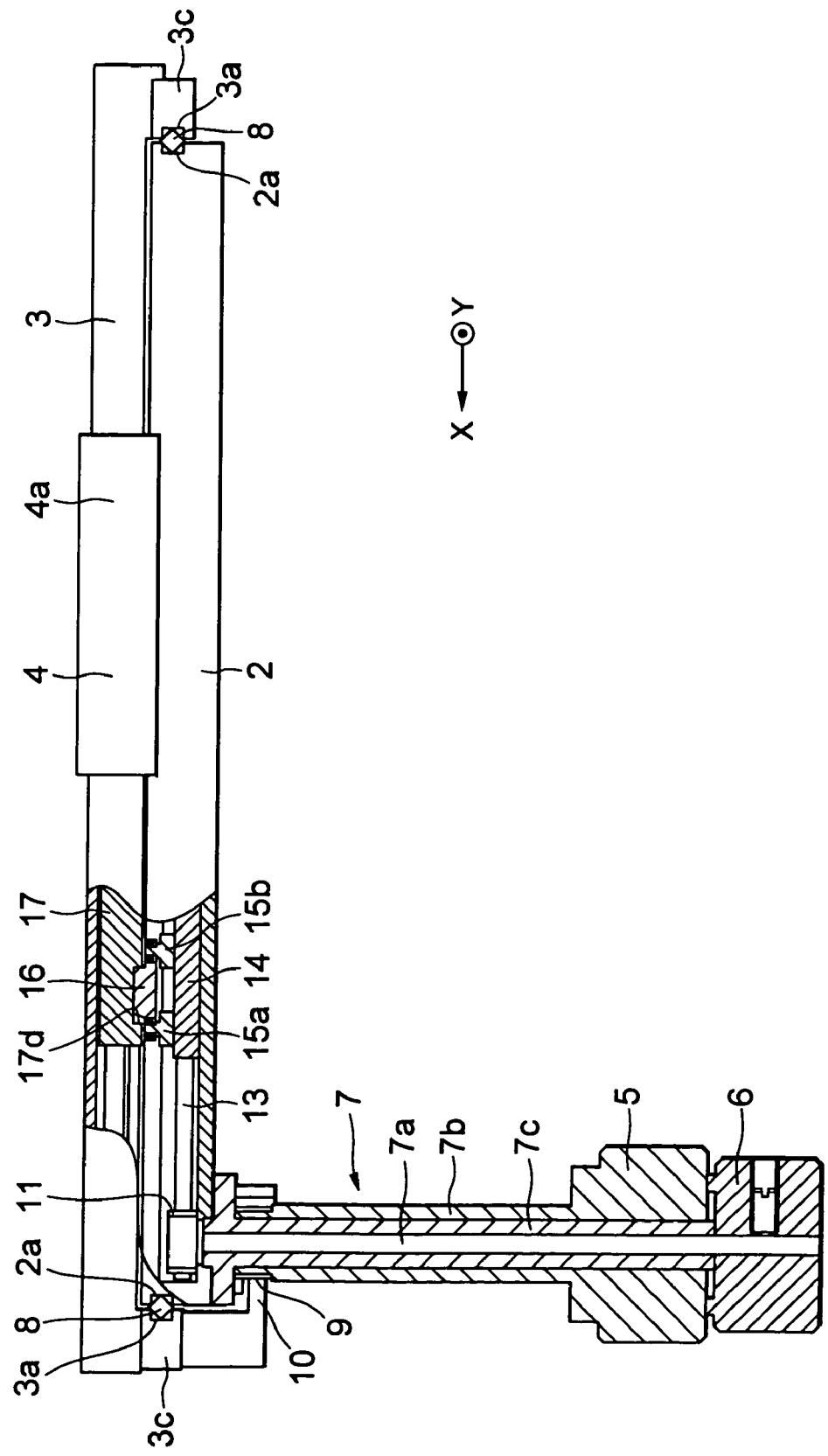
FIG. 3 is a partly cut-away side view showing the structure of the stage according to the first embodiment of the present invention, as seen from the side opposite to FIG. 1.

As shown in FIG. 3, the rotational operation means 7 is composed of a cylindrical support member 7c fixed to the base member 2 to extend downwardly, a Y direction operation handle 5 for moving the first moving member 3 in the Y direction and an X direction operation handle 6 for moving the second moving member 4 in the X direction. The Y direction operation handle 5 is integrally provided on the bottom of an outer shaft 7b that is rotatably fitted outside the cylindrical support member 7c, the external shaft 7b having a pinion 9 (which will be described later) on its top end portion. The X direction operation handle 6 is integrally provided on the bottom of an inner shaft 7a fitted inside the cylindrical support member 7c, the inner shaft 7a having a drive pulley 11 (which will be described later) on its top end portion. With the above-described structure, it is possible to rotate the outer shaft 7b and the inner shaft 7a by rotating the Y direction operation handle 5 and the X direction operation handle 6 independently to rotate the pinion 9 and the drive pulley 11.

On the right and left end faces of the base member 2, guide grooves 2a, 2a extending along the Y direction are formed. On the right and left portions of the first moving member 3, downward projection portions 3c, 3c that form side surfaces opposed to both the side faces of the base member 2 are fixed by screws (not shown). On the downward projection portions 3c, 3c, guide grooves 3a, 3a opposed to the guide grooves 2a, 2a and extending along the Y direction are formed. Rollers 8 are disposed between the opposed guide rollers. The first moving member 3 can move along the Y direction relative to the base member 2 by means of the above-described guide mechanism.

As shown in FIG. 1, one of the downward projection portions 3c, 3c formed on the first moving member 3 is extending downwardly more than the other downward projection portion. A rack 10 extending in the Y direction is provided on the inner side of said one of the downward projection portions. A pinion 9 that engages the rack 10 is provided on the upper end portion of the outer shaft 7b of the rotational operation means 7. The pinion 9 can be rotated by rotating the Y direction operation handle 5 as described before.

Thus, when the pinion 9 is rotated by rotating the Y direction operation handle 5, the first moving member 3 moves in the Y direction thanks to the engagement between the pinion 9 and the rack 10.

Figure 2:
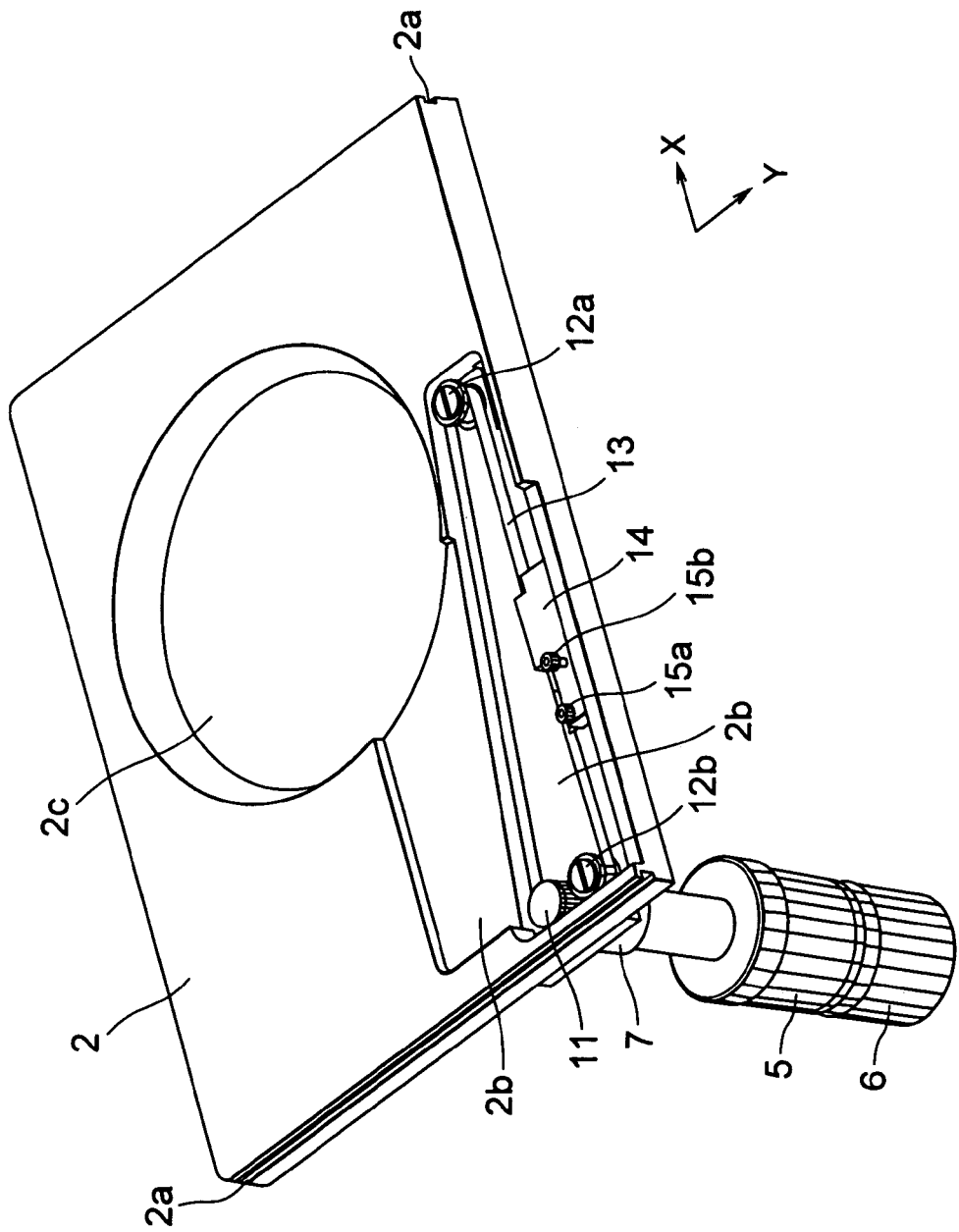
FIG. 2 shows the structure of a base member of the stage according to the first embodiment of the present invention as seen from above.

As shown in FIG. 2, a recess 2b that opens upwardly is formed on the base member 2. The drive pulley 11 is rotatably supported on the bottom of the recess 2b. The drive pulley 11 can be rotated by rotating the X direction operation handle 6. In addition, two driven pulleys 12a, 12b are rotatably supported on the bottom of the recess 2b on the base member 2. A belt 13 is looped around the drive pulley 11 and the two driven pulleys 12a, 12b. The driven pulleys 12a, 12b are arranged in such a way that the belt 13 extends linearly along the X direction. A linear movement member (or an X direction guide) 14 is fixedly attached to the belt 13 between the driven pulleys 12a, 12b. The X direction guide 14 is moved linearly along the X direction when the X direction operation handle 6 is rotated. A stopper may be provided for the X direction guide 14 to prevent it from moving out of a predetermined range, if circumstances demand.

The number and the position of the driven pulleys 12a, 12b and the manner in which the belt 13 is looped are not limited to those described above, but it should be looped in such a way as to allow linear movement of the X direction guide 14 along the X direction.

On the X direction guide 14, two guides 15a, 15b each of which has a rolling bearing at its tip end are provided. The rolling bearings of the two guides 15a, 15b retain therebetween a transmission portion 16 in the form of a plate-like member extending along the Y direction, as shown in FIG. 3, in such a way that the transmission portion 16 is movable in the Y direction. Thus, the transmission portion 16 can move in the Y direction, and when the X direction guide 14 moves in the X direction, the transmission portion moves in the X direction with the X direction guide 14. The aforementioned recess 2b extends in such a way as to allow linear movement of the transmission portion 16 in the Y direction.

Although the rolling bearings are provided at the tip ends of the guides 15a, 15b to reduce friction between the guides 15a, 15b and the transmission portion 16 as described above, the rolling bearings may be replaced by bush bearings, or the tip end portion of the guides 15a, 15b may simply be constructed by a material with a low friction with the transmission portion 16.

Figure 4:
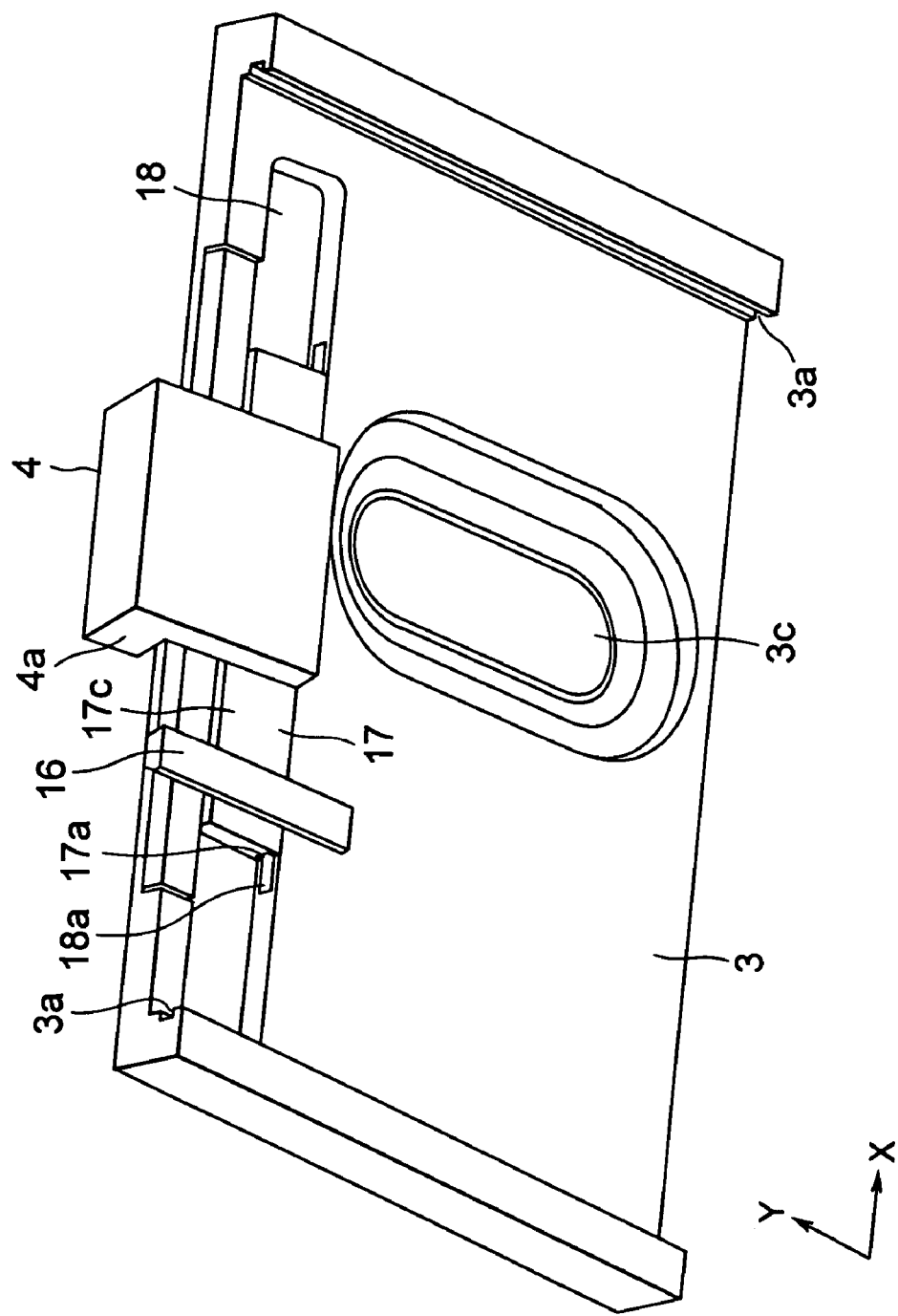
FIG. 4 shows the structure of a first moving member of the stage according to the first embodiment of the present invention as seen from below.

As shown in FIG. 4, the first moving member 3 is a plate-like member extending in the X and Y directions and has an aperture 3c for allowing illumination light etc. from below the stage 1 to pass through it. The first moving member 3 has a slot 18 extending in the X direction formed thereon. The slot 18 has, on its both sides extending in the X direction, guiding linear projections 18a extending in the X direction formed thereon. An X direction moving member 17 is set in the slot 18. The X direction moving member 17 is, on its both sides extending in the X direction, formed with guide grooves 17a extending in the X direction and fitted on the guiding linear projections 18a. Thus, the X direction moving member 17 can move in the X direction within the slot 18 by means of rollers or balls provided between the guide grooves 17a and the guiding linear projections 18a. On the bottom surface 17c of the X direction moving member 17, a rectangular long groove 17d extending in the Y direction is formed. The upper portion of the transmission portion 16 is fitted into the rectangular long groove 17d, so that the transmission portion 16 is fixed on the bottom surface 17c of the X direction moving member 17. The transmission portion 16 is extending in the Y direction along the bottom surface of the first moving member 3 and has a width nipped by the aforementioned guides 15a, 15b so that it is movable in the Y direction between the guides 15a, 15b.

Figure 7:
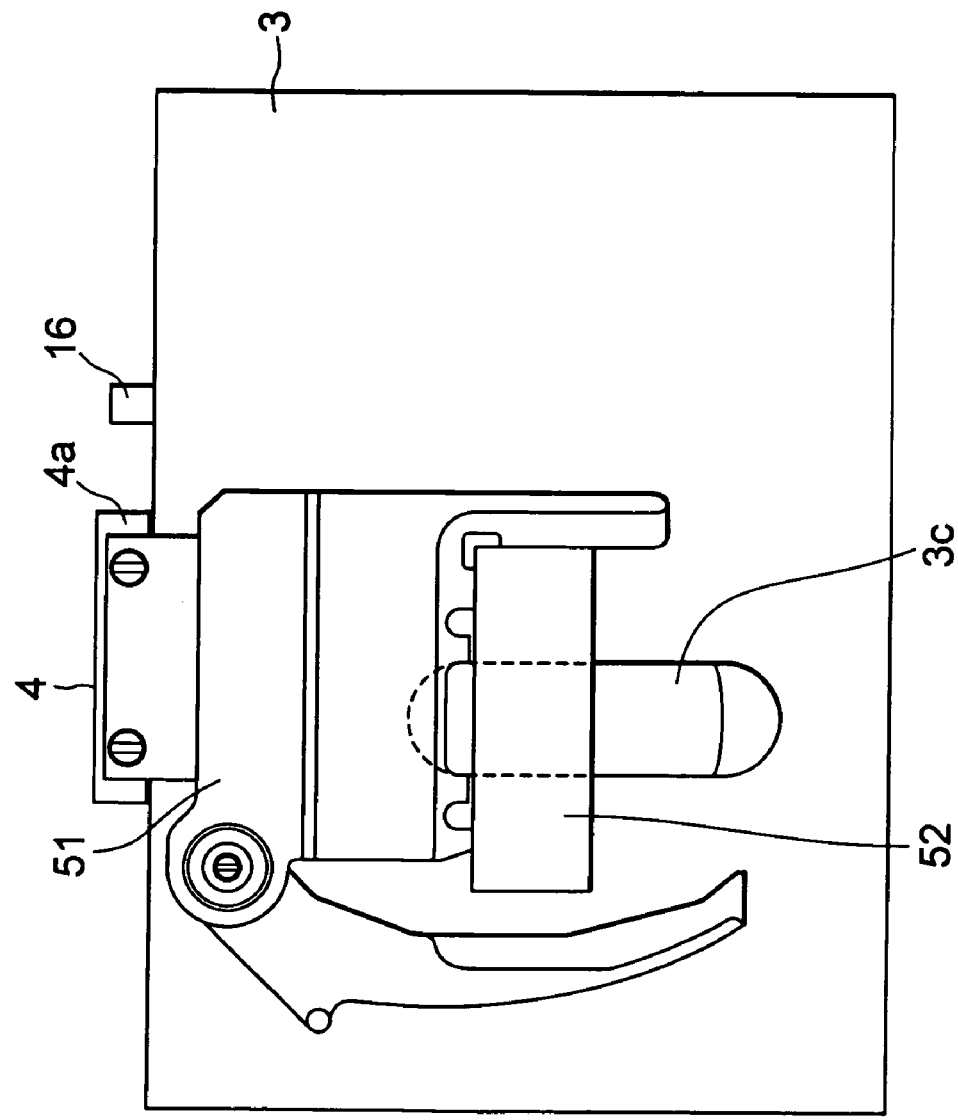
FIG. 7 schematically shows the stage according to the first and the second embodiments of the present invention as seen from above.

The second moving member 4 is fixed on the bottom surface 17c of the X direction moving member 17. The second moving member 4 is a plate-like member having an L-shaped cross section and including a portion 4a that extends upwardly by and in contact with a side surface of the first moving member 3. As shown in FIG. 7, a specimen holder 51 is attached to the second moving member 4 in such a way that the first moving member 3 is sandwiched between the plate-like member and the specimen holder 51.

FIG. 7 schematically shows the stage according to this embodiment as viewed from above. At one edge of the first moving member 3, a part (i.e. the above-described portion 4a) of the second moving member 4 can be seen, the specimen holder 51 being attached to this portion. The specimen holder 51 holds a slide glass 52. In the stage shown in FIG. 7, an end portion of the transmission portion 16 is seen at one edge of the first moving member 3.

When the transmission portion 16 moves in the X direction, the X direction moving member 17, the second moving member 4 and the specimen holder 51 also move in the X direction integrally. On the other hand, when the first moving member 3 moves in the Y direction, the transmission portion 16, the X direction moving member 17, the second moving member 4 and the specimen holder 51 also move in the Y direction with the first moving member 3. Since the transmission portion 16 can move in the Y direction between the above-described guides 15a, 15b of the X direction guide 14, the X direction guide 14 does not receive a force that moves it in the Y direction.

Incidentally, the rack 10 is not illustrated in FIG. 4.

As per the above, in this embodiment, the X direction guide 14 causes, upon linear movement of the X direction guide 14 in the X direction, the second moving member 4 to move linearly in the X direction by means of the transmission portion 16 and the X direction moving member 17 while restricting movement of the transmission portion 16 in the X direction relative to the X direction guide 14. When the first moving member 3 and the second moving member 4 integrally move in the Y direction, the X direction guide 14 guides the transmission portion 16 along the Y direction.

The operation of the above-described stage 1 according to this embodiment will be described.

When a specimen is to be moved in the X direction, the X direction operation handle 6 is rotated. This causes the drive pulley 11 fixed on the inner shaft 7a to rotate, and the belt 13 also moves accordingly. Thus, the X direction guide 14 provided on the belt 13 moves in the X direction. This causes the transmission portion 16 retained between the guides 15a, 15b of the X direction guide 14 to move in the X direction integrally with the X direction moving member 17 and the second moving member 4. By the above-described operation, the second moving member 4 is moved in the X direction. Thus, by rotating the X direction operation handle 6, it is possible to move the specimen held on the specimen holder 51 in the X direction together with the specimen holder 51 fixed on the second moving member 4.

When the specimen is to be moved in the Y direction, the Y direction operation handle 5 is rotated. This causes the pinion 9 provided on the outer shaft 7b to rotate, and the rack 10 of the first moving member 3 engages the pinion 9. Thus, the first moving member 3 moves in the Y direction integrally with the second moving member 4. By the above-described operation, the second moving member 4 moves in the Y direction. Thus, by rotating the Y direction operation handle 5, it is possible to move the specimen held by the specimen holder 51 in the Y direction together with the specimen holder 51 fixed on the second moving member 4.

As per the above, it is possible to move the stage 1 according to this embodiment in the X and Y directions by rotating the Y direction operation handle 5 and the X direction operation handle 6 that are fixed in their positions and coaxial with each other.

In the stage according to this embodiment, the belt is looped around the drive pulley and the two driven pulleys, and the X direction guide is attached to the belt, as described above. However, the present invention is not limited by this feature, and a wire looped around the drive pulley and the two driven pulleys may be used, and the X direction guide may be attached to that wire.

In the stage 1 according to this embodiment, the two operation handles 5, 6 are mounted on the base member 2. Thus, the position of the operation handles 5, 6 will not change even when the first moving member 3 and the second moving member 4 are moved, and they are easy to operate. Accordingly, if the stage according to this embodiment is installed and used in a microscope, a user can perform operations of moving the stage easily while observing a specimen through the eyepiece. In addition, the positional relationship between the operation handles and other operating portions on the microscope, such as a light control knob and an up-and-down movement handle, will not change. Therefore, it is possible to reduce fatigue of an observer who continues to use the microscope for a long time.

The stage 1 according to this embodiment can be manufactured using inexpensive parts and the construction thereof can be made simple, as compared to conventional stages. Accordingly, it can be manufactured with a reduced cost and with a higher degree of precision. It is possible to construct the stage 1 as what is called a two-plate stage by arranging the X direction guide 14 and the transmission portion 16 in the recess 2b formed on the base member 2 without using parts having complex structures to make its thickness substantially equal to the thickness of only the base member 2 and the first moving member 3. Therefore, it is possible to provide a stage that is lighter than what is called a three-plate stage. In addition, it is possible to provide a thin stage that is suitable for a biological microscope.

Although in the stage 1 according to this embodiment, the transmission portion 16 is disposed on the X direction moving member 17 and the guides 15a, 15b are disposed on the base member (the X direction guide 14), their dispositions may be reversed.

Second Embodiment

A stage according to the second embodiment of the present invention will be described with reference to FIG. 5. In the embodiments that will be described in the following, the parts same as those in the above-described stage according to the first embodiment will be designated by the same reference signs to omit redundant descriptions, and only different parts will be described in detail.

Figure 5:
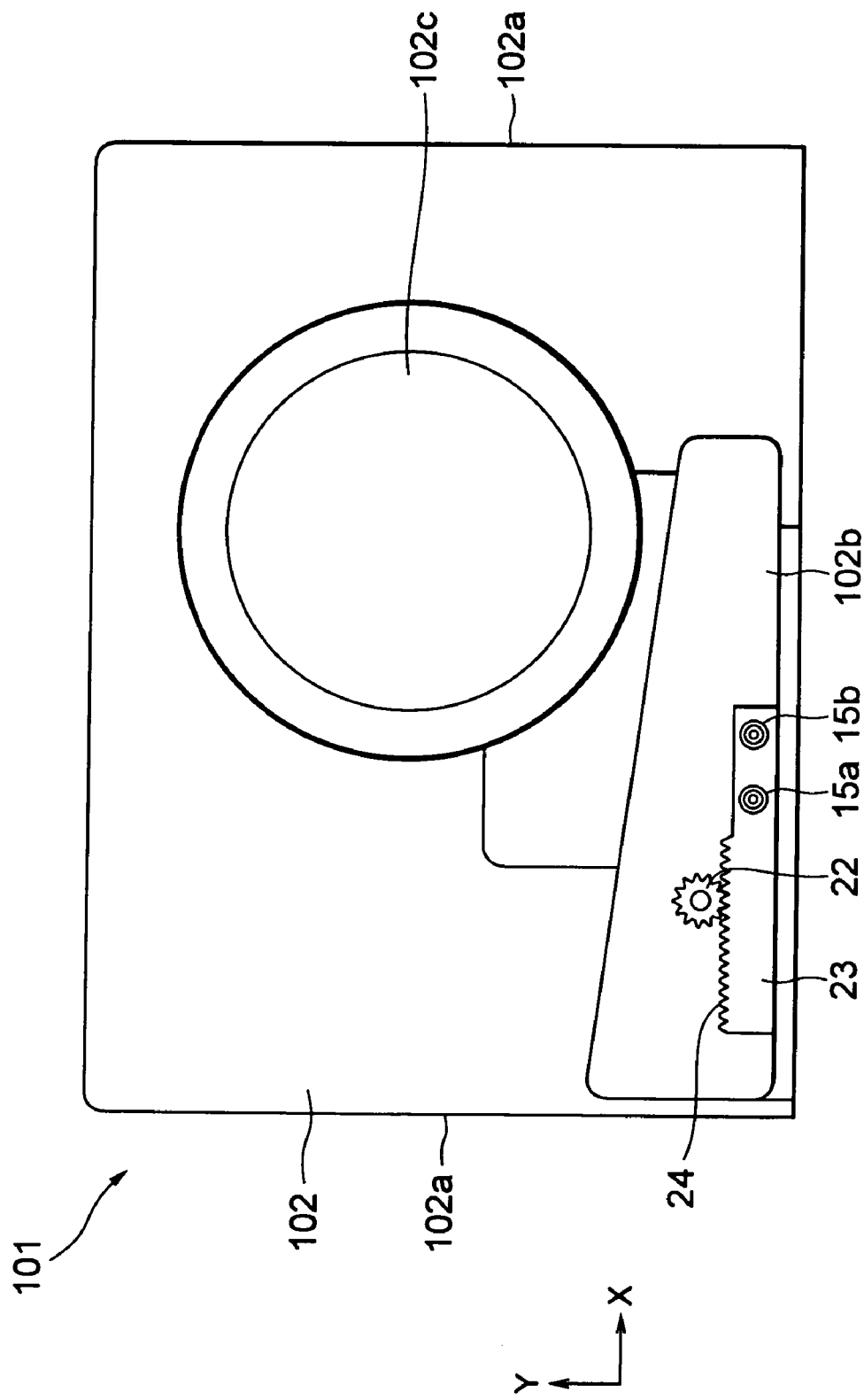
FIG. 5 shows the structure of a base member of a stage according to a second embodiment of the present invention, as seen from directly above.

As shown in FIG. 5, in the stage 101 according to the second embodiment, a pinion 22 is rotatably set on the bottom of a recess 102b of a base member 102. The pinion 22 is provided on the top end portion of the inner shaft 7a of the rotational operation means 7, in place of the drive pulley in the first embodiment. The pinion can be rotated by rotating the X direction operation handle 6. An X direction guide 23 is provided on the bottom of the recess 102b in such a way as to be linearly movable in the X direction. On one side of the X direction guide 23, a rack 24 extending in the X direction for engagement with the pinion 22 is provided. Thus, when the pinion 22 is rotated by rotating the X-direction operation handle 6, the X direction guide 23 is moved in the X direction by the rack 24.

Two guides 15a, 15b each of which has a bearing at its tip end are provided on the X direction guide 23 as with the X direction guide 14 in the above-described embodiment. The rolling bearings of the two guides 15a, 15b retain therebetween a transmission portion 16 (not shown) in such a way that the transmission portion 16 is movable in the Y direction. Thus, the transmission portion 16 can move in the Y direction relative to the X direction guide 23, and when the X direction guide 23 moves in the X direction, the transmission portion 16 moves in the X direction with the X direction guide 23.

The structure of this embodiment other than those described above is the same as that of the above-described first embodiment.

The operation of the above-described stage 101 according to this embodiment will be described. When a specimen is to be moved in the X direction, the X direction operation handle 6 is rotated. This causes the pinion 22 to rotate, and the X direction guide 23 moves in the X direction due to engagement of the rack 24 of the X direction guide 23 with the pinion 22. Thus, the transmission portion 16 retained between the guides 15a, 15b of the X direction guide 23 is moved in the X direction integrally with the X direction moving member 17 and the second moving member 4. By the above-described operation, the second moving member 4 is moved in the X direction. Thus, by rotating the X direction operation handle 6, it is possible to move the specimen held on the specimen holder 51 in the X direction together with the specimen holder 51 fixed on the second moving member 4.

When the specimen is to be moved in the Y direction, the second moving member 4 is moved in the Y direction by the operation same as that in the above-described first embodiment. Accordingly, it is possible to move the specimen held by the specimen holder 51 in the Y direction together with the specimen holder 51 fixed on the second moving member 4 by rotating the Y direction operation handle 5.

As per the above, in the stage 101 according to this embodiment, it is possible to move the specimen in the X and Y directions by rotating the Y direction operation handle 5 and the X direction operation handle 6, and advantageous effects same as those of the above-described first embodiment can be realized.

Third Embodiment

A stage according to the third embodiment of the present invention will be described with reference to FIG. 6. The stage according to this embodiment is what is called a three-plate stage in which first moving member and a second moving member are stacked on a base member.

Figure 6:
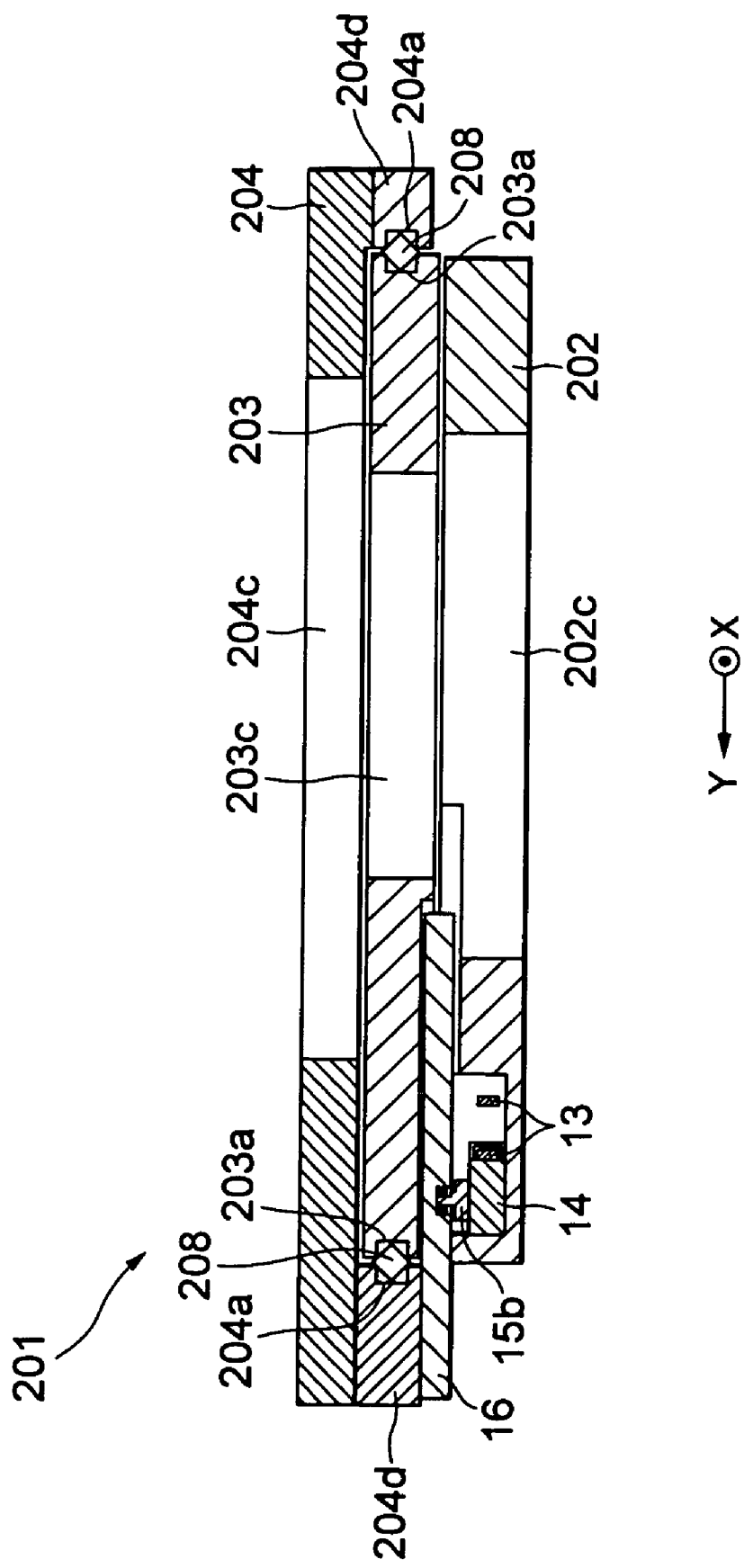
FIG. 6 is a cross sectional view in the Y direction of a stage according to a third embodiment of the present invention.

As shown in FIG. 6, the stage 201 according to this embodiment is composed of a base member 202 to be fixed on a stage mount surface of a microscope or the like, a first moving member 203 provided on the base member 202 in such a way as to be movable in the Y direction and a second moving member 204 provided on the first moving member 203 in such a way as to be movable in the X direction.

The base member 202 is a plate-like member extending in the X and Y directions and has an aperture 202c for allowing illumination light etc. from below the stage 201 to pass through it. On the base member 202, there is provided rotational operation means 7, a drive pulley 11, driven pulleys 12a, 12b, a belt 13 and an X direction guide 14 having guides 15a, 15b, as with the above-described first embodiment.

The first moving member 203 and the second moving member 204 are plate-like members extending in the X and Y directions, each of which has an aperture 203c, 204c for allowing illumination light etc. from below the stage 201 to pass through it. A specimen holder (not shown) for holding a specimen is fixedly set on the top surface of the second moving member 204.

The first moving member 203 can move in the Y direction relative to the base member 202 by means of a guide mechanism (not shown) having the structure same as the guide mechanism in the above-described first embodiment for the base member 2 and the first moving member 3.

On the first moving member 203, there is provided a rack 10 extending in the Y direction and engaging a pinion 9 provided on the upper end portion of the outer shaft 7b of the rotational operation means 7 as with the above-described first embodiment, though the rack is not shown in FIG. 6.

Thus, when the pinion 9 is rotated by rotating the Y direction operation handle 5, the first moving member 203 is moved in the Y direction due to engagement of the pinion 9 and the rack 10.

Guide grooves 203a, 203a extending in the X direction are formed on the left and right sides of the first moving member 203. On the right and left portions of the second moving member 204, downward projection portions 204d, 204d that form side surfaces opposed to both the side faces of the first moving member 203 are integrally formed. On the downward projection portions 204d, 204d of the second moving member 204, guide grooves 204a, 204a extending in the X direction and opposed to the guide grooves 203a, 203a are formed. Rollers 208, 208 are set between the opposed guide grooves. With the above-described guide mechanism, the second moving member 204 can move in the X direction relative to the first moving member 203. A transmission portion 16 is fixed on the bottom surface of one of the downward projection portions 204a, 204a formed on the second moving member 204. Thus, when the transmission portion 16 moves in the X direction, the second moving member 204 also moves in the X direction integrally with it. On the other hand, when the first moving member 203 moves in the Y direction, the transmission portion 16 and the second moving member 204 also move in the Y direction with the first moving member 203.

As per the above, in this embodiment, the X direction guide 14 causes, upon linear movement of the X direction guide 14 in the X direction, the second moving member 204 to move linearly in the X direction while restricting movement of the transmission portion 16 in the X direction relative to the X direction guide 14 to cause the transmission portion 16 to move together. When the first moving member 203 and the second moving member 204 integrally move in the Y direction, the X direction guide 14 guides the transmission portion 16 along the Y direction.

The operation of the above-described stage according to this embodiment will be described.

When the specimen is to be moved in the X direction, the X direction operation handle 6 is rotated. This causes the drive pulley 11 integrally formed on the inner shaft 7a to rotate, and the belt 13 also moves accordingly. Thus, the X direction guide 14 provided on the belt 13 moves in the X direction. This causes the transmission portion 16 retained between the guides 15a, 15b of the X direction guide 14 to move in the X direction integrally with the second moving member 204. By the above-described operation, the second moving member 204 is moved in the X direction. Thus, by rotating the X direction operation handle 6, it is possible to move the specimen held on the specimen holder on the second moving member 204 in the X direction.

When the specimen is to be moved in the Y direction, the Y direction operation handle 5 is rotated. This causes the pinion 9 integral with the outer shaft 7b to rotate, and the rack 10 of the first moving member 203 engages the pinion 9. Thus, the first moving member 203 moves in the Y direction integrally with the second moving member 204. By the above-described operation, the second moving member 204 moves in the Y direction. Thus, by rotating the Y direction operation handle 5, it is possible to move the specimen held by the specimen holder on the second moving member 204 in the Y direction.

As per the above, it is possible to move the stage 201 according to this embodiment in the X and Y directions by rotating the Y direction operation handle 5 and the X direction operation handle 6. Thus, the advantageous effects same as those of the above-described first embodiment can be realized.

The stage 201 according to this embodiment is what is called a three-plate stage, and it may be used in industrial microscopes etc.

Fourth Embodiment

A biological microscope of an erecting system according to the fourth embodiment of the present invention will be described with reference to FIG. 8.

Figure 8:
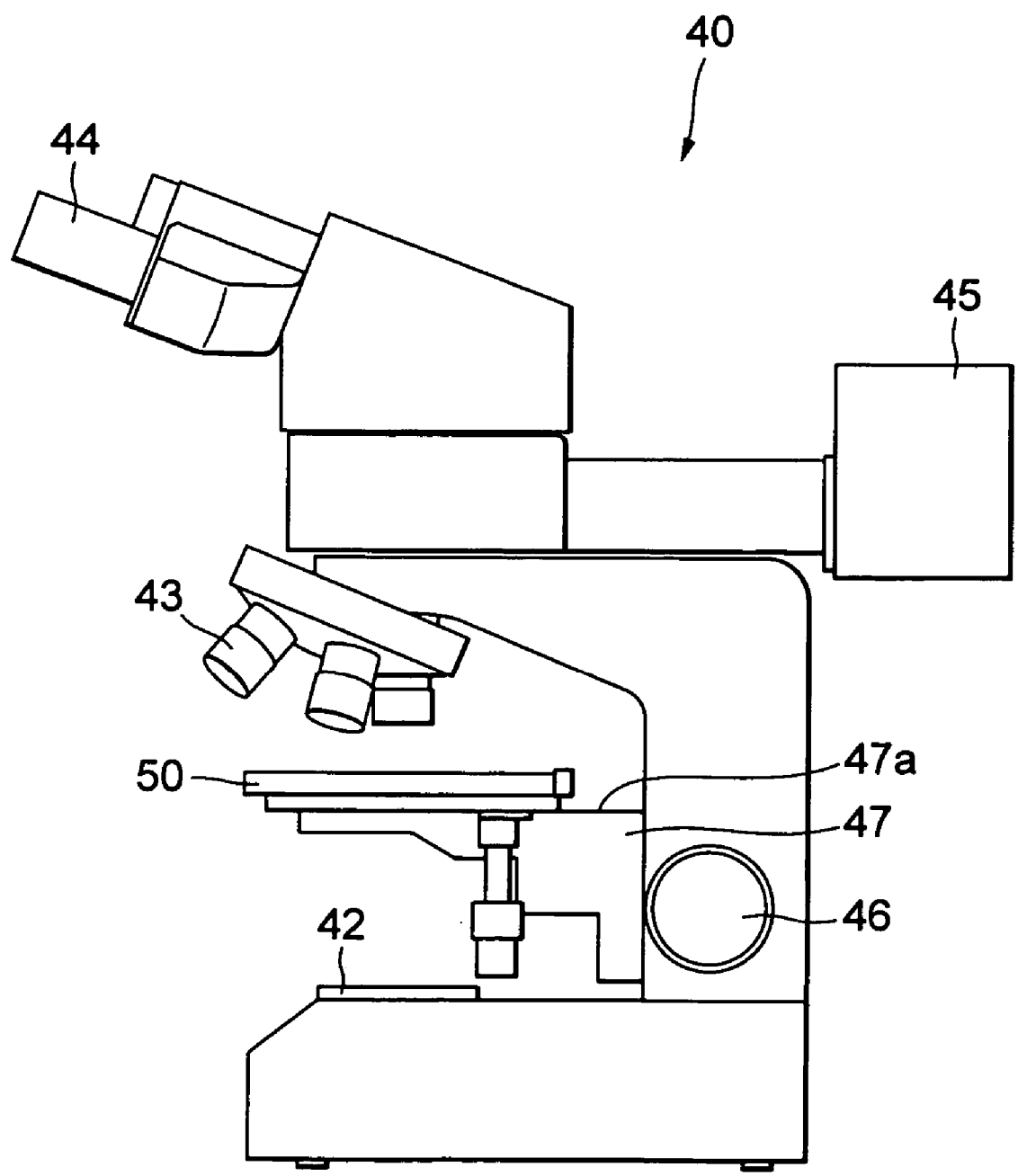
FIG. 8 schematically shows the structure of a biological microscope of an erecting system according to a fourth embodiment of the present invention.

FIG. 8 schematically shows the structure of the biological microscope of an erecting system according to the fourth embodiment of the present invention.

The biological microscope of an erecting system (which will be simply referred to as a microscope hereinafter) 40 according to this embodiment is a biological microscope of an erecting system equipped with a stage 50 having the structure same as the above-described stage according to the first embodiment.

In FIG. 8, a specimen (not shown) placed on the stage 50 is illuminated by illumination light from a transmission illumination unit 42. Light transmitted through the specimen is guided to an eyepiece observation unit 44 via an objective lens 43 and an optical system (not shown) provided in the main body of the microscope. Thus, the observer can observe the specimen with a naked eye. The stage 50 will be described later.

The specimen (not shown) placed on the stage 50 is illuminated by, for example in the case of fluorescence observation, excitation light from the illumination unit 45. Thus, fluorescence light generated from the specimen is guided to an image-taking and observation portion (not shown) via the objective lens 43 and the optical system (not shown). In this way, the observer can perform fluorescence observation of the specimen.

In the microscope 40 according to this embodiment, the stage 50 is mounted on a stage mount surface 47a of a sub-stage 47 which can be moved up and down by rotating a stage up-and-down handle 46. In the microscope 40 according to this embodiment, the stage 50 realizes advantageous effects same as those of the above-described stage according to the first embodiment.

The stage according to the second or the third embodiment may also be used as the stage of the microscope 40 according to this embodiment.

The stage of the microscope 40 according to this embodiment can be operated without causing serious fatigue, and it can reduce fatigue of the observer who continues observation for a long time. Since the stage 50 of the microscope 40 according to this embodiment has a simple structure using inexpensive parts, a reduction in the cost can be achieved.

As described above, in this embodiment, the stage of the present invention is applied to a microscope of an erecting system. However, the invention is not limited by this feature, but the stage according to the present invention may be applied to inverted microscopes.

According to the present invention, it is possible to provide a stage having a simple structure and good usability, and a microscope equipped with such a stage.

The invention claimed is:

1. A stage comprising:
a base member extending in an X direction and a Y direction, in which said Y direction is perpendicular to said X direction;
a recess portion that is formed on said base member extending in said X direction;
a linear movement member that is disposed in said recess portion and movable in said X direction;
a first moving member that is provided on said base member and movable in said Y direction with respect to said base member the first moving member defining a slot extending in said X direction; and
an X direction moving member that is disposed in said slot and movable in said X direction along said slot,
wherein said X direction moving member is always engaged with said linear movement member and a second moving member which is moved together with said X direction moving member in said X direction, and has a transmission portion that guides said first moving member to move in said Y direction with respect to said base member,
said second moving member has a specimen holder that is disposed on said first moving member, and
said linear movement member has two guides, and said transmission portion that is extending in said Y direction and guides said second moving member and said X direction moving member together with said first moving member in said Y direction along said guides.

2. The stage according to claim 1, wherein said transmission portion has a length longer than a moving range in said Y direction of said first moving member that is moved on said base member in said Y direction.

3. A stage comprising:
a base member extending in an X direction and a Y direction, in which said Y direction is perpendicular to said X direction;
a recess portion that is formed on said base member extending in said X direction;
a linear movement member that is disposed in said recess portion and movable in said X direction;
a first moving member that is provided on said base member and movable in said Y direction with respect to said base member, the first moving member defining a slot extending in said X direction; and
an X direction moving member that is disposed in said slot and movable in said X direction alone said slot,
wherein said X direction moving member is always engaged with said linear movement member and a second moving member which is moved together with said X direction moving member in said X direction, and has a transmission portion that guides said first moving member to move in said Y direction with respect to said base member,
said second moving member has a specimen holder that is disposed on said first moving member, and
said slot is an aperture that is formed on said first moving member and extending in said X direction.

4. A stage comprising:
a base member extending in an X direction and a Y direction, in which said Y direction is perpendicular to said X direction;
a recess portion that is formed on said base member extending in said X direction;
a linear movement member that is disposed in said recess portion and movable in said X direction;
a first moving member that is provided on said base member and movable in said Y direction with respect to said base member, the first moving member defining a slot extending in said X direction;
an X direction moving member that is disposed in said slot and movable in said X direction along said slot; and
X and Y operation members respectively rotatably fixed to said base member in order to move said first moving member in said Y direction and said second moving member in said X direction on said base member,
wherein said X direction moving member is always engaged with said linear movement member and a second moving member which is moved together with said X direction moving member in said X direction, and has a transmission portion that guides said first moving member to move in said Y direction with respect to said base member,
said second moving member has a specimen holder that is disposed on said first moving member,
said X and Y operation members have respectively a drive member for moving said linear movement member in said X direction and a pinion that is engaged with said first moving member in said Y direction with respect to said base member, and said first moving member has a rack to engage with said pinion, and
said first moving member equipped with said rack is moved in said Y direction by operating said Y operation member to rotate said pinion.

5. The stage according to claim 4, wherein said drive member is composed of a belt on which said linear movement member is fixed and a plurality of sliding rods enabling said belt to be rotated.

6. The stage according to claim 5, wherein said drive member to which said linear movement member is fixed is an X direction guide on which a rack is formed and a pinion which is engaged with said rack.

7. A stage comprising:
a base member extending in an X direction and a Y direction, in which said Y direction is perpendicular to said X direction;
a recess portion that is formed on said base member extending in said X direction;
a linear movement member that is disposed in said recess portion and movable in said X direction;
a first moving member that is provided on said base member and movable in said Y direction with respect to said base member, the first moving member defining a slot extending in said X direction; and
an X direction moving member that is disposed in said slot and movable in said X direction along said slot,
wherein said X direction moving member is always engaged with said linear movement member and a second moving member which is moved together with said X direction moving member in said X direction, and has a transmission portion that guides said first moving member to move in said Y direction with respect to said base member,
said second moving member has a specimen holder that is disposed on said first moving member, and
an aperture for allowing illumination light to path therethrough is formed each of said base member and said first moving member.

8. A stage comprising:
a base member extending in an X direction and a Y direction, in which said Y direction is perpendicular to said X direction;
a recess portion that is formed on said base member extending in said X direction;
a linear movement member that is disposed in said recess portion and movable in said X direction;
a first moving member that is provided on said base member and movable in said Y direction with respect to said base member, the first moving member defining a slot extending in said X direction; and
an X direction moving member that is disposed in said slot and movable in said X direction along said slot,
wherein said X direction moving member is always engaged with said linear movement member and a second moving member which is moved together with said X direction moving member in said X direction, and has a transmission portion that guides said first moving member to move in said Y direction with respect to said base member,
said second moving member has a specimen holder that is disposed on said first moving member, and
said recess portion and said slot are disposed facing each other upon setting said first moving member on said base member, and said linear movement member is engaged with said transmission portion.

9. A stage comprising:
a base member extending in an X direction and a Y direction, in which said Y direction is perpendicular to said X direction;
a recess portion that is formed on said base member extending in said X direction;
a linear movement member that is disposed in said recess portion and movable in said X direction;
a first moving member that is provided on said base member and movable in said Y direction with respect to said base member, the first moving member defining a slot extending in said X direction; and an X direction moving member that is disposed in said slot and movable in said X direction along said slot, wherein said X direction moving member is always engaged with said linear movement member and a second moving member which is moved together with said X direction moving member in said X direction, and has a transmission portion that guides said first moving member to move in said Y direction with respect to said base member, said second moving member has a specimen holder that is disposed on said first moving member, and said linear movement member has projections to engage with said transmission portion.

10. A stage comprising:

a base member extending in an X direction and a Y direction, in which said Y direction is perpendicular to said X direction;

a recess portion that is formed on said base member extending in said X direction;

a linear movement member that is disposed in said recess portion and movable in said X direction;

a first moving member that is provided on said base member and movable in said Y direction with respect to said base member, the first moving member defining a slot extending in said X direction; and an X direction moving member that is disposed in said slot and movable in said X direction along said slot, wherein said X direction moving member is always engaged with said linear movement member and a second moving member which is moved together with said X direction moving member in said X direction, and has a transmission portion that guides said first moving member to move in said Y direction with respect to said base member, said second moving member has a specimen holder that is disposed on said first moving member, and said second moving member is a plate-like member having an L-shape and including a portion that extends upwardly by and in contact with a side surface of said first moving member.

* * * * *